US 11,485,077 B2

(12) United States Patent
Ewald et al.

(10) Patent No.: US 11,485,077 B2
(45) Date of Patent: Nov. 1, 2022

(54) FORMING A LAYER OF BUILD MATERIAL

(71) Applicant: HEWLETT-PACKARD DEVELOPMENT COMPANY, L.P., Spring, TX (US)

(72) Inventors: Brent Ewald, Vancouver, WA (US); William Winters, Vancouver, WA (US); Pierre J Kaiser, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 109 days.

(21) Appl. No.: 16/608,453

(22) PCT Filed: Oct. 23, 2017

(86) PCT No.: PCT/US2017/057804
§ 371 (c)(1),
(2) Date: Oct. 25, 2019

(87) PCT Pub. No.: WO2019/083493
PCT Pub. Date: May 2, 2019

(65) Prior Publication Data
US 2021/0283842 A1 Sep. 16, 2021

(51) Int. Cl.
*B29C 64/218* (2017.01)
*B33Y 10/00* (2015.01)
(Continued)

(52) U.S. Cl.
CPC ............ *B29C 64/218* (2017.08); *B22F 12/38* (2021.01); *B22F 12/63* (2021.01); *B28B 1/00* (2013.01);
(Continued)

(58) Field of Classification Search
None
See application file for complete search history.

(56) References Cited

U.S. PATENT DOCUMENTS

2001/0045678 A1   11/2001   Kubo et al.
2014/0084517 A1*  3/2014    Sperry .................. B29C 64/245
                                                              264/406
(Continued)

FOREIGN PATENT DOCUMENTS

CN   106001565 A   10/2016
CN   106312062     1/2017
(Continued)

OTHER PUBLICATIONS

Shanjani, Y. et al. Material Spreading and Compaction in Powder-based Solid Freeform Fabrication Methods: Mathematical Modeling, Sep. 25, 2008, http://edge.rit.edu/edge/P1055.

*Primary Examiner* — Alison L Hindenlang
*Assistant Examiner* — Debjani Roy
(74) *Attorney, Agent, or Firm* — HP Inc. Patent Department

(57) ABSTRACT

According to one aspect, there is provided apparatus for forming a layer of build material for three-dimensional printing. The apparatus comprises a spreader to spread a volume of build material to form a layer of build material on a build platform, wherein at least one end of the spreader is to remain a constant distance from a build material retaining wall in proximity to at least one edge of the build platform as the spreader is moved over the surface of the build platform, and further wherein at least a portion of the spreader is below the top of the retaining wall.

20 Claims, 4 Drawing Sheets

(51) Int. Cl.
  *B33Y 30/00* (2015.01)
  *B29C 64/255* (2017.01)
  *B29C 64/25* (2017.01)
  *B22F 12/00* (2021.01)
  *B22F 12/63* (2021.01)
  *B28B 1/00* (2006.01)

(52) U.S. Cl.
  CPC ............ *B29C 64/25* (2017.08); *B29C 64/255* (2017.08); *B33Y 10/00* (2014.12); *B33Y 30/00* (2014.12)

(56) References Cited

U.S. PATENT DOCUMENTS

2014/0302187 A1   10/2014   Pawlikowski et al.
2017/0014907 A1   1/2017    Ng et al.
2017/0050378 A1   2/2017    Ederer et al.
2017/0120335 A1   5/2017    DeMuth et al.
2017/0157841 A1   6/2017    Green
2017/0173874 A1   6/2017    Batchelder et al.
2017/0190112 A1*  7/2017    Thorson ................. B33Y 30/00
2018/0133978 A1*  5/2018    Yen ........................ B33Y 30/00
2019/0118472 A1*  4/2019    Torrealba .............. B29C 64/205
2019/0257766 A1   8/2019    Yang
2020/0376708 A1*  12/2020   Shi ......................... B28B 1/001

FOREIGN PATENT DOCUMENTS

RU             120389 U1        9/2012
WO       WO2016068899 A1        5/2016
WO       WO-2017095416          6/2017

* cited by examiner

FORMING A LAYER OF BUILD MATERIAL

BACKGROUND

Powder-based three-dimensional (3D) printing systems typically form successive layers of a powder, or powder-like, build material on a build platform and selectively solidify portions of each formed layer to generate a 3D object on a layer-by-layer basis. Various selective solidification techniques exist that include, for example, selective laser sintering (SLS), binder deposition, and fusing agent and thermal fusing systems. Build materials may include suitable plastic, metal, and ceramic build materials.

BRIEF DESCRIPTION

Examples will now be described, by way of non-limiting example only, with reference to the accompanying drawings, in which.

DETAILED DESCRIPTION

One technique for forming a layer of a powder or powder-like build material is to use a roller mounted on a moveable carriage to spread a pile of build material over a build platform. The roller may be powered to rotate as the roller is moved over the build platform. In such systems, a pile or volume of build material may be initially deposited on a platform to one side of the build platform using, for example, a hopper or other build material deposition device, before being spread by the roller.

Referring now to FIG. 1 there is shown a schematic diagram of an improved build material layer forming system according to one example.

Figure 1A:
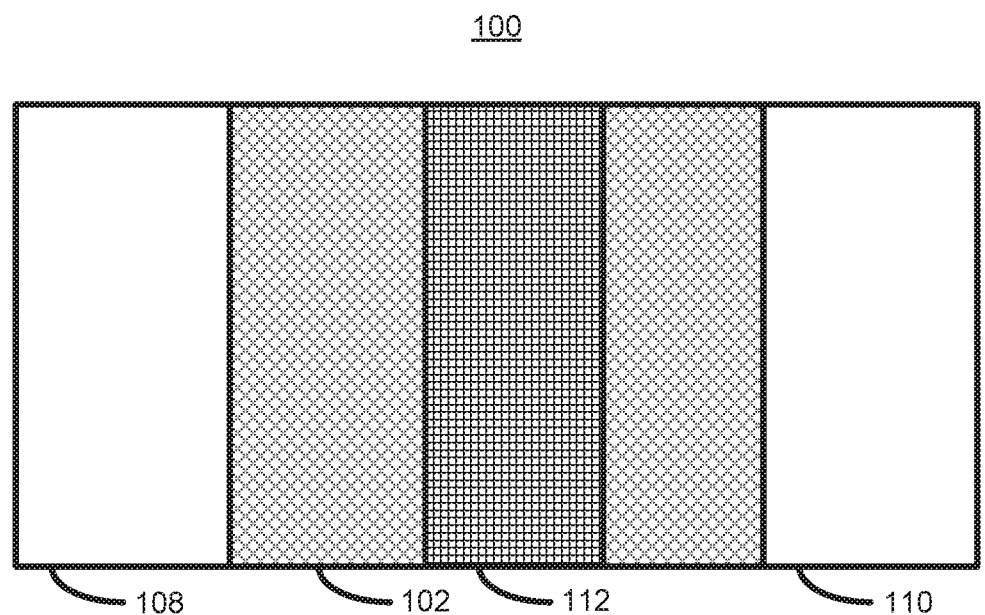
FIGS. 1A and 1B are schematic diagrams of an apparatus according to one example.
Figure 1B:
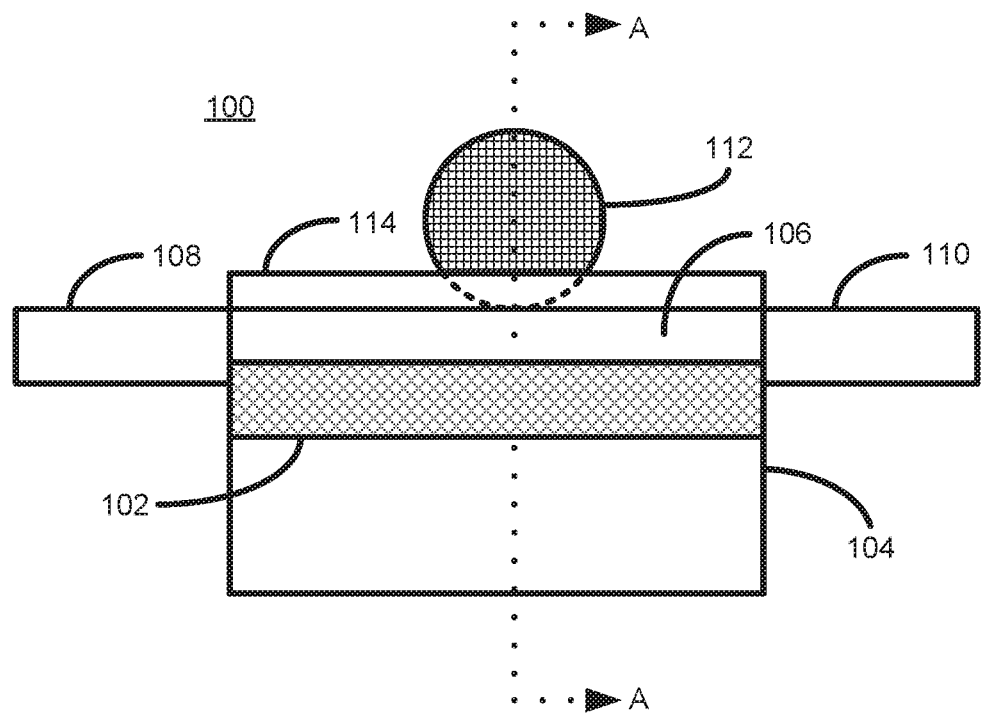

FIG. 1A shows a simplified plan view illustration of a portion of a 3D printing system according to one example. FIG. 1B shows a corresponding side view.

The 3D printing system 100 comprises a build platform 102 on which successive layers of build material, such as a powder or powder-like build material, may be formed. Suitable build materials may include, for example, suitable plastic, metal, ceramic, and the like build materials. The build platform 102 is movable in the vertical, or z-axis, such that after each formed layer of build material has been processed by the 3D printing system the build platform 102 may be lowered by a small amount to allow a subsequent layer of build material to be formed thereon. In one example, each layer of build material formed may be in the region of about 80 to 120 microns thick, although in other examples thinner or thicker layers of build material may be formed.

The build platform 102 has a rectangular shape and fits within a housing 104 that collectively forms an open-topped cuboidal-shaped build chamber 106 in which 3D objects may be generated on a layer-by-layer basis.

Two lateral auxiliary platforms 108 and 110 are provided, one on either side of the build platform 102. One of the auxiliary platforms 108 is to receive a pile of build material to be spread over the build platform 102, and the other auxiliary platform 110 is to receive any excess build material leftover after a layer of build material has been formed.

A roller 112 is provided to spread build material from the first auxiliary platform 108, over the build platform 102. Any excess build material may be spread onto the second auxiliary platform 110 by the roller 112. The roller 112 may be mounted, for example, on a carriage (not shown) that is moveable over the auxiliary platforms 108 and 110 and over the build platform 102. The roller 112 may be powered to rotate about its central axis in a direction based on the direction in which the roller carriage is being moved.

As shown in FIG. 1B, a pair of build material retaining walls 114 are provided that extend at least partially up the height of the roller 112. In one example the retaining walls extend along at least the length of the build platform 102 in an axis parallel to the axis of movement of the roller 112. The roller 112 is moveable between the retaining walls, as is described further below with additional reference to FIGS. 2 and 3. In one example the retainer walls are rigid, or substantially rigid, retaining walls, although in some examples the retaining walls may have a degree of flexibility.

Although not shown, the 3D printing system 100 may additionally comprise a selective solidification module to enable portions of each formed layer of build material to be selectively solidified in accordance with a 3D object model. The selective solidification module may use any suitable selective solidification technology including: selective laser sintering, fusing agent and fusing energy; and chemical binders.

Figure 2:
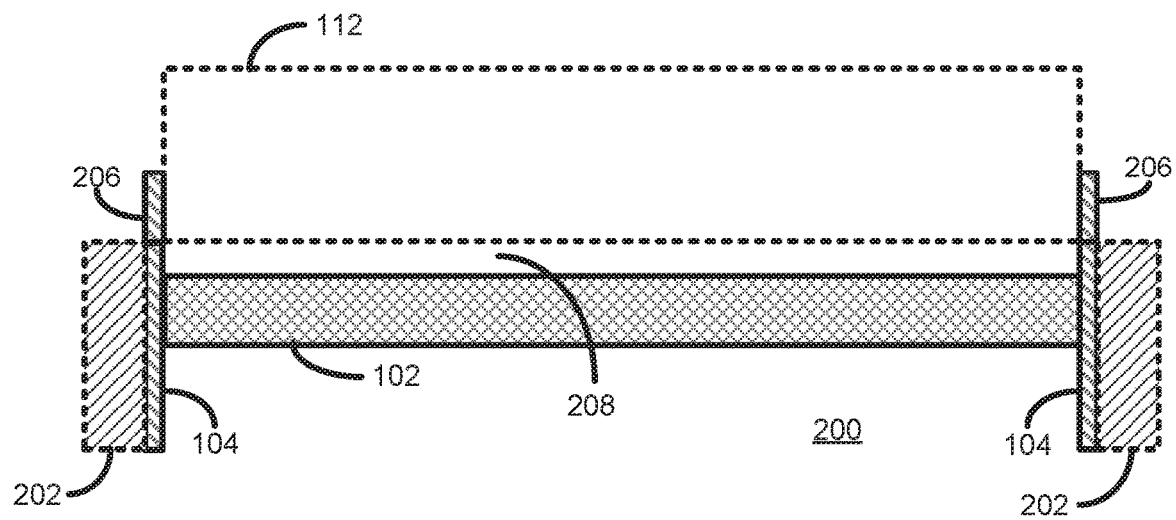
FIG. 2 is a schematic section view of an apparatus according to one example.

FIG. 2 is a schematic section view of FIG. 1B taken through the plane A-A, in accordance with a first example. FIG. 2 shows a build unit 200 for use in a 3D printer, according to one example. The build unit 200 is to be removably installed in a 3D printing build unit receiver housing 202 shown in dotted lines. The build unit may, for example, be installed into a 3D printer, for example in the build unit receiver housing 202, in order for a 3D print job to be performed therein. After completion, the build unit 200 may be removed from the 3D printer build unit receiver housing 202 and, for example, be installed in a post-processing station where non-solidified build material may be removed and any 3D printed objects may be recovered. In this example, the roller 112 is part of the 3D printer, and as such is also shown in dotted lines.

The build unit 200 comprises the housing 104 within which the build platform 102 is vertically moveable. For example, the build platform 102 is moveable downwards to create a void or space between the build platform 102 and the base of the roller 112 into which a layer of build material may be formed. An initial layer of build material is formed directly on the surface of the build platform 102, whereas subsequently formed layers of build material are formed on previously formed layers.

As is shown in FIG. 2, the build unit housing 104 comprises a pair of retaining walls 206 which extend vertically above the top of the housing 104 and at least partially up the height of the roller 112. In the example shown the retaining walls 206 extend around ⅓ of the height of the roller, although in other examples the retaining walls 206 may extend to a greater or lesser extent. In general, however, the retaining walls should extend up the height of the roller by at least the height of the pile of build material that is to be spread by the roller.

The pair of retaining walls are located parallel to the axis of movement of the roller 112, such that a base portion of the roller moves within the confines of the retaining walls. In one example the retaining walls 206 are spaced apart to allow the roller 112 to move without contact to the retaining walls 206. The spacing of the retaining walls may allow for a small gap, for example less than 5 mm, to exist between the ends of the roller 112 and their respective retainer wall 206.

Figure 3:
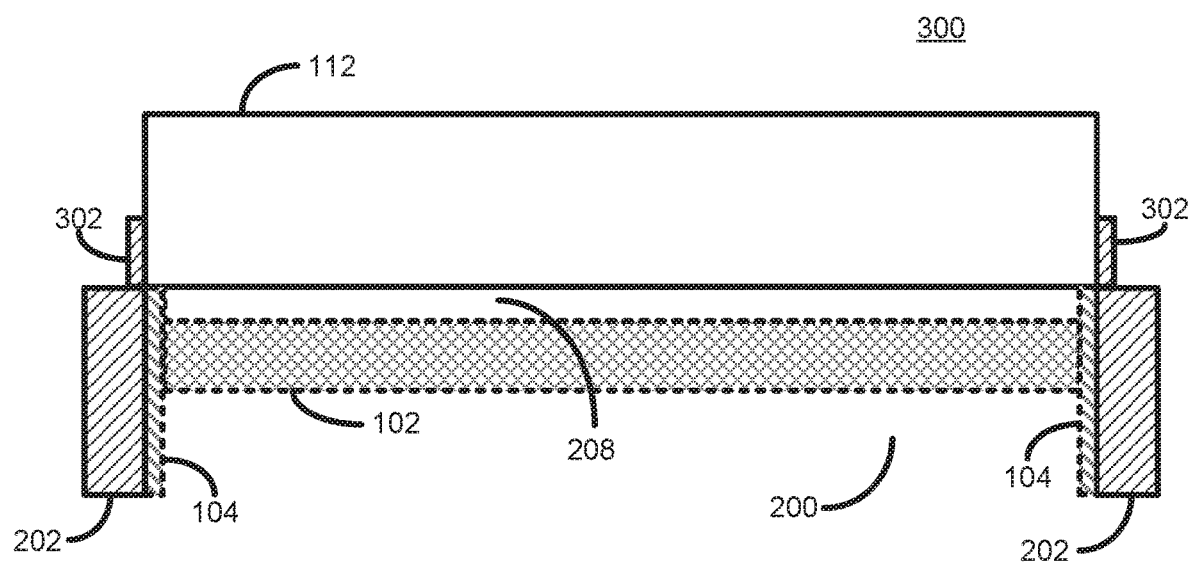
FIG. 3 is a schematic section view of an apparatus according to one example.

FIG. 3 is a schematic section view of FIG. 1B taken through the plane A-A, in accordance with a further example. FIG. 3 shows a portion of a 3D printer 300 according to one example. The 3D printer 300 comprises a 3D printer build unit receiver housing 202 to removably receive a 3D printer build unit, such as the build unit 200 shown in FIG. 2. The 3D printer 300 additionally comprises a roller 112. According, in FIG. 3, the elements of the build unit 200, namely the housing 104 and the build platform 102, are shown in dotted lines. The 3D printer build unit receiver 202 comprises retaining walls 302 as described above within which the roller 112 is to move.

The retainer walls may serve a number of purposes. A first purpose is to prevent, or at least reduce the amount of, build material that spreads out beyond the lateral edges of the spreading roller as a pile of build material is spread over a build platform. In some examples this may allow lateral vacuum systems that may be used to recover such laterally spreading build material to be removed from 3D printing systems.

Furthermore, the retaining walls may enable layers of build material from being formed with a higher degree of surface flatness. For example, the lateral retaining walls may help prevent layers of build material being formed from having a slightly convex form, especially at those portions of the build material layer formed by the extremities of the spreading roller. This is because the retaining walls prevent build material from laterally spreading beyond the retaining walls.

Figure 4:
FIG. 4 is a schematic side view of a spreading roller according to one example.

Referring now to FIG. 4 there is shown a side view of a spreading roller 400 according to one example. In this example the roller 400 is formed with a pair of lateral channels 402. The channels 402, positioned towards each extremity of the roller 400, are to allow the roller 400 to be positioned over the retaining walls such that at least a portion of the retaining walls are within the channels 402 as the roller 400 is moved over the build platform. Provision of the channels 402 may further reduce the amount of build material that spreads laterally beyond the retaining walls during a build material spreading operation.

Figure 5:
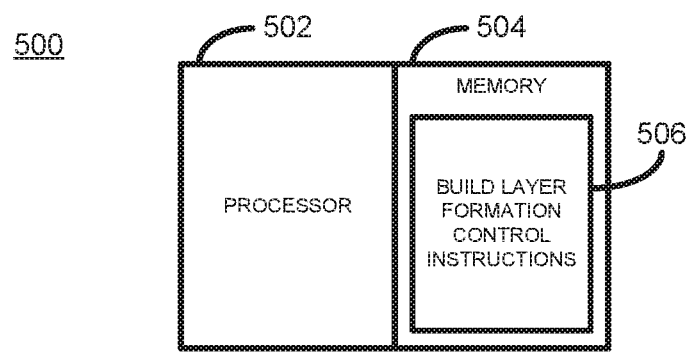
FIG. 5 is a block diagram of a 3D printer controller according to one example.
Figure 6:
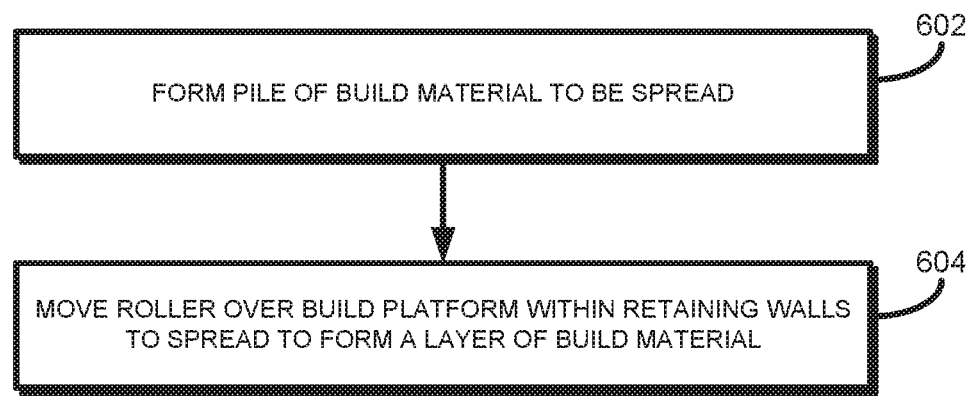
FIG. 6 is a flow diagram outlining a method of operating a 3D printing system according to one example.

Operation of a 3D printer, such as the 3D printer 100, may be controlled by a 3D printer controller 500, as illustrated in FIG. 5. The controller 500 comprises a processor, such as a microprocessor, 502 coupled to a memory 504 by an appropriate bus (not shown). The memory stores build layer formation control instructions 506 that are processor understandable instructions. When the instructions 506 are executed by the processor 502 the processor 502 controls the operation of elements of the 3D printer 100 as described below with reference to the flow diagram of FIG. 6.

At block 602, the controller 500 controls an element of the 3D printer 100 to form a pile of build material that is to be spread on the build platform 102. For example, the controller 500 may control a build material deposition hopper (not shown) to form a pile of build material on the auxiliary platform 108.

At block 604, the controller 500 controls the roller 112 to move over the build platform within the retaining walls to spread the pile of build material to form a layer of build material on the build platform 102.

Figure 7A:
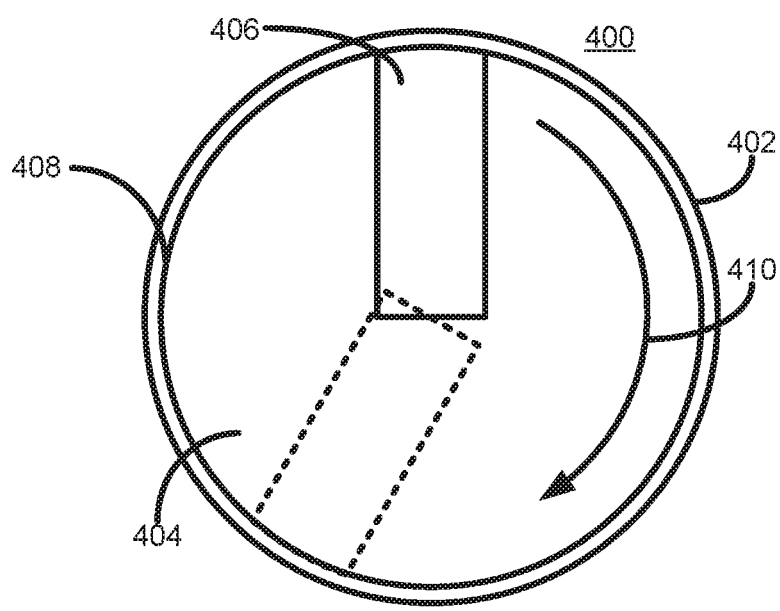
FIGS. 7A and 7B are schematic illustrations of an apparatus according to further examples.
Figure 7B:
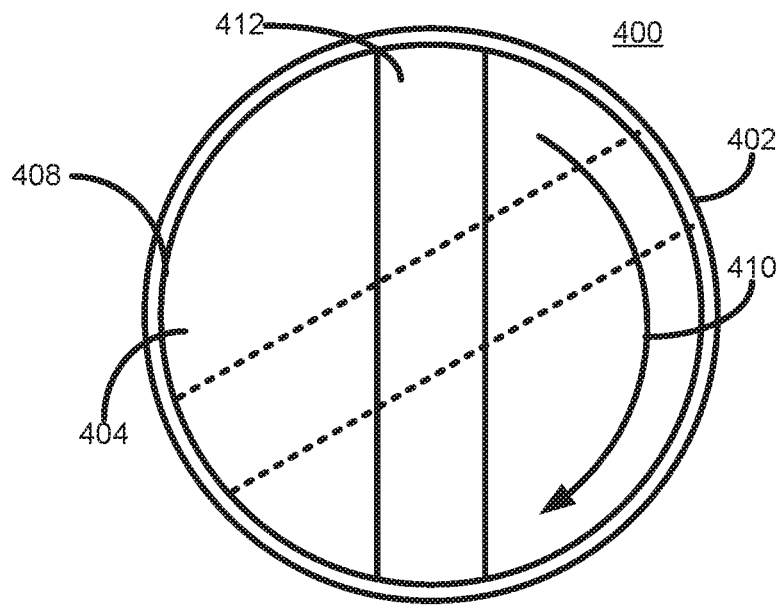

A further example of a portion of a rotary 3D printing system 400 is illustrated in FIGS. 7A and 7B. FIGS. 7A and 7B show a plan view of a cylindrical build unit 400 in which is located a vertically movable circular build platform 404. In FIG. 7A a roller or spreader 406 is provided to form a layer of build material on the build platform 404. The roller 406 is rotatable (as illustrated by the dotted lines), in a direction shown by arrow 410, around an axis central to the build platform 404 to form a layer of build material as the roller 406 is rotated. In this example, a build material deposition mechanism (not shown) may form a pile of build material on the build platform 404 to be spread by the roller 406 to form a layer of build material. The build unit 402 has a circular retaining wall 408 which, as previously described, extends to a height at least partially up the side of the roller 406. In the example shown in FIG. 7A the roller 406 extends across the radius of the build platform 404 such that external end of the roller 406 remains in close proximity to the retaining wall 408 as the roller 406 is rotated in the direction 410.

In a further example, illustrated in FIG. 7B, a roller 412 is provided that extends across the diameter of the build platform 404 such that both ends of the roller remain in close proximity to the retaining wall 408 as the roller 412 is rotated in the direction 410.

The system 400 may additionally include a selective solidification module and other modules (not shown).

In these examples the rollers 406 and 412 may be additional rotated around their longitudinal axis are they are rotated in the direction 410.

From the examples described herein it can be generally understood that at least one end of the spreader remains a constant distance from a build material retainer wall as the spreader is moved over a build platform to form a layer of build material thereon. This is the case both where the spreader is moved along an axis parallel to a longitudinal retaining wall and where the spreader is axially rotated within a circular retaining wall. In both cases it can be seen that at least a portion of the spreader is positioned below the top of the retaining wall as the spreader is moved over the build platform.

The retaining wall may, in use, be in proximity to at least one edge of the build platform, for example and may be provided either as part of the build unit, or as part of a build unit receiving housing of a 3D printing system.

Although the examples described herein refer generally to a pair of retaining walls, in one example only a single retaining wall may be provided. Additionally, although the examples described herein refer to a roller, in other examples other appropriate spreader apparatus may be used, such as, for example, a wiper blade.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. Apparatus for forming a layer of build material for three-dimensional printing, comprising:
    a spreader to spread a volume of build material to form a layer of build material on a build platform, wherein the build platform indexes downward for each subsequent layer of build material,
    wherein at least one end of the spreader is to remain a constant distance from a build material retaining wall in proximity to at least one edge of the build platform as the spreader is moved over a surface of the build platform, and further
    wherein at least a portion of the spreader is below a top of the retaining wall.

2. The apparatus of claim 1, wherein the apparatus is a part of a 3D printing system, and wherein the retaining wall is one of: part of a build unit receiving housing; and part of a build unit.

3. The apparatus of claim 2, wherein the build unit comprises four side walls forming an open-topped cuboidal-shaped build chamber and wherein the build platform is a rectangular build platform vertically movable within the build chamber.

4. The apparatus of claim 3, wherein two opposite side walls comprise build material retaining walls extending above a base of the spreader to prevent build material from being displaced outside of the build chamber as the spreader is moved parallel to the retaining walls.

5. The apparatus of claim 2, wherein the build unit receiving housing comprises build material retaining walls extending above a base of the spreader to prevent build material from being displaced outside of the build chamber as the spreader is moved parallel to the retaining walls.

6. The apparatus of claim 2, wherein the build unit comprises a cylindrical build chamber within which a circular build platform is vertically movable and wherein the build unit comprises a circular retaining wall extending above a base of the spreader to prevent build material from being displaced outside of the build chamber as the spreader is rotated axially within the circular retaining wall.

7. The apparatus of claim 1, wherein the build material retaining wall extends at least partially up a height of the roller.

8. The apparatus of claim 1, wherein the spreader is a roller, and wherein the roller has a channel therein to be positioned over the retaining wall such that at least a portion of the retaining wall is within the channel as the roller is moved over the build platform.

9. The apparatus of claim 2, further comprising an auxiliary platform on one side of the build platform to receive a pile of build material to be spread over the build platform by the spreader.

10. The apparatus of claim 1, further comprising:
    a build chamber, wherein the build platform is moveable within the build chamber; and
    a lateral auxiliary platform positioned at one side of a top of the build chamber to receive a supply of build material for spreading by the spreader;
    wherein the build material retaining wall extends above an upper surface of the lateral auxiliary platform and along a direction across the build chamber in which the spreader moves to form a build material layer.

11. The apparatus of claim 10, wherein the build material retaining wall comprises a first retaining wall along a first side of the build chamber and a second retaining wall along an opposite side of the build chamber.

12. The apparatus of claim 1, wherein the build material retaining wall extends along a direction across the build chamber in which the spreader moves to form a build material layer.

13. The apparatus of claim 12, wherein a distance between an end of the spreader and the build material retaining wall remains constant as the spreader moves over the build platform.

14. The apparatus of claim 1, wherein the spreader is a roller, and wherein the roller has a channel along a length thereof, the build material retaining wall extending into the channel such that a portion of the roller is disposed on either side of the retaining wall.

15. A method of forming a layer of build material on a build platform, comprising:
    moving a spreader to spread a volume of build material to form a layer of build material on the build platform;
    wherein moving the spreader comprises moving the spreader such that at least one end of the spreader remains a constant distance from a build material retaining wall and
    wherein at least a portion of the spreader is below the top of the retaining wall as the spreader is moved over the surface of the build platform; and
    indexing the build platform downward for each subsequent layer of build material to be formed.

16. The method of claim 15, wherein the build platform is a rectangular-shaped build platform within a cuboidal-shaped build unit, the build unit having build material retaining walls on two opposite sides thereof, and wherein moving the spreader comprises moving the spreader in an axis parallel to the build material retaining walls.

17. The method of claim 15, wherein the build platform is a circular-shaped build platform within a cylindrical-shaped build unit, the build unit having a circular build material retaining wall, and wherein moving the spreader comprises axially rotating the spreader within the circular retaining wall.

18. The method of claim 15, wherein moving the spreader comprises moving the spreader such that at least a portion of the spreader is below the top of the retaining walls.

19. A three-dimensional printing system, comprising:
    a roller to spread a volume of build material to form a layer of build material on a rectangular build platform within a cuboidal-shaped build unit, wherein the build platform indexes downward for each subsequent layer of build material;
    a build unit, or a build unit receiver housing to receive a build unit, having a pair of build material retaining walls on two opposite edges thereof;
    wherein the roller is to move between the build material retaining walls such that at least a portion of the roller is below the top of the build material retaining walls as the roller is moved to form a layer of build material on the build platform.

20. The three-dimensional printing system of claim 19, wherein each end of the roller is in close proximity to its respective build material retaining wall to prevent build material from spreading out beyond the build material retaining walls as build material is spread by the roller.

* * * * *